W. W. GREGORY & P. D. MAIRE.
FISH LINE BOB OR FLOAT.
APPLICATION FILED JAN. 27, 1915.

1,240,043.

Patented Sept. 11, 1917
2 SHEETS—SHEET 1.

WITNESSES:
Geo. C. Kricker.
M. Schwan.

INVENTOR
WALTER W. GREGORY.
PETER D. MAIRE.

BY
Fisher Truwert
ATTORNEYS

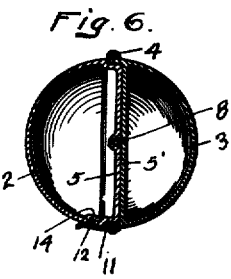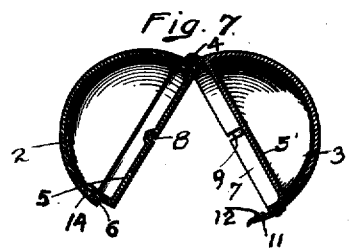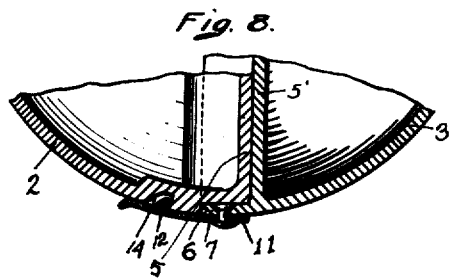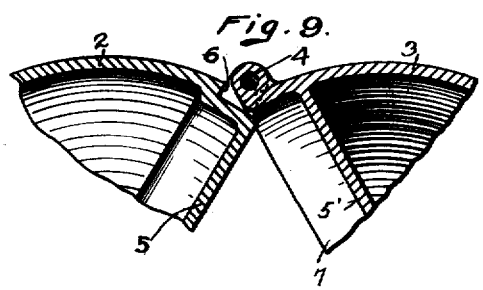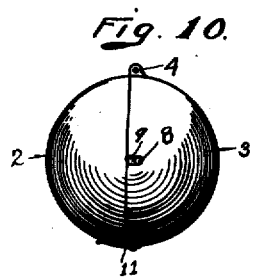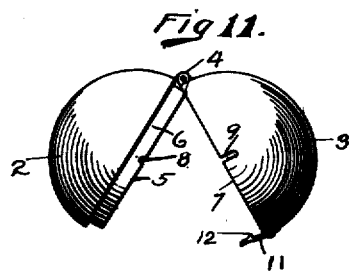

UNITED STATES PATENT OFFICE.

WALTER W. GREGORY AND PETER D. MAIRE, OF LAKEWOOD, OHIO; SAID MAIRE ASSIGNOR OF HIS RIGHT TO W. R. WHITE, OF CLEVELAND, OHIO.

FISH-LINE BOB OR FLOAT.

1,240,043.  Specification of Letters Patent.  Patented Sept. 11, 1917.

Application filed January 27, 1915. Serial No. 4,582.

*To all whom it may concern:*

Be it known that WALTER W. GREGORY and PETER D. MAIRE, citizens of the United States, residing at Lakewood, in the county of Cuyahoga and State of Ohio, have invented certain new and useful Improvements in Fish-Line Bobs or Floats, of which the following is a specification.

This invention relates to improvements in a fish-line bob or float, and the improvement comprises a float or bob made of separable sections to permit the device to be placed upon or removed from a fishing-line without disconnecting the line from the rod or removing or detaching any part affixed to the line such as leaders, hooks, weights, etc. The bob or float is also particularly constructed to slide freely on the line without predetermined limits.

Figure 1:
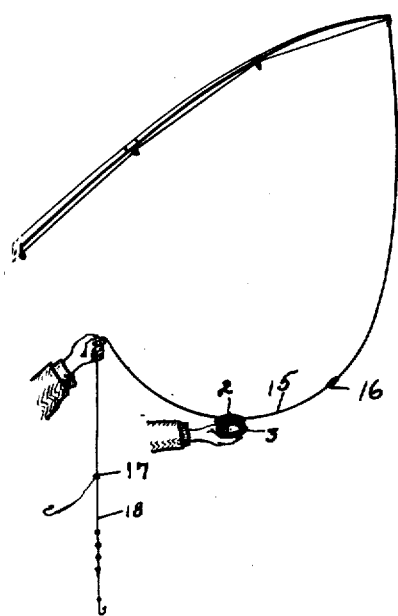
Figure 2:
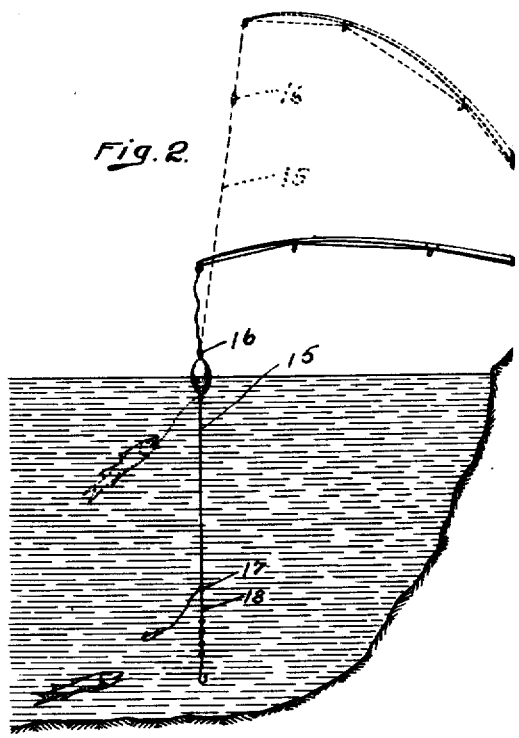
Figure 3:
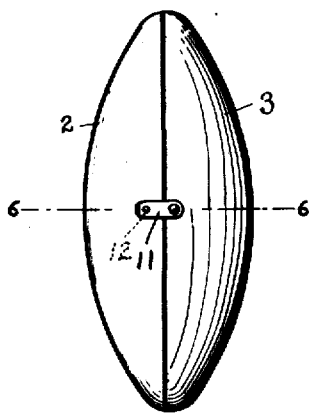
Figure 4:
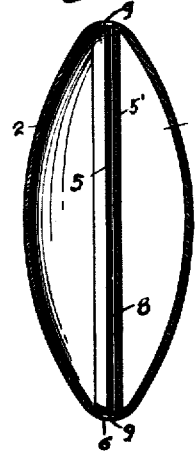
Figure 5:
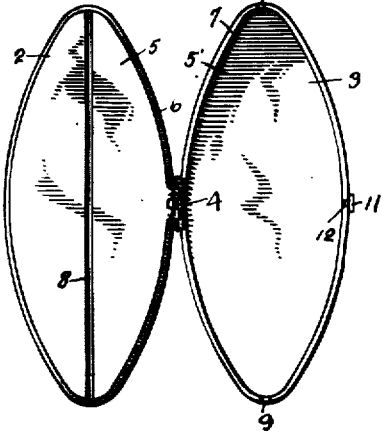

In the accompanying drawings, Figure 1 is a view on reduced scale of the bob or float as it appears when being placed upon or removed from a fishing line. Fig. 2 is a view showing the bob in use in sliding connection with the fish-line. Fig. 3 is a side elevation of the bob showing the sections closed. Fig. 4 is a sectional view centrally through the bob showing the central passage for the fish-line extending from end to end thereof. Fig. 5 is an elevation of the inner faces of the two sections when swung open. Fig. 6 is a transverse section on line 6—6, Fig. 3 showing the two sections closed and Fig. 7 is a similar view showing the sections partly open. Figs. 8 and 9 are enlarged sectional details of the spring catch and the hinge portions, respectively. Figs. 10 and 11 are end views of the bob or float in open and closed positions, respectively.

In some waters and under certain conditions a quick detachment or attachment of a bob or float upon the fishing-line in hand is desirable but such quick change is not possible with the ordinary bobs or floats obtainable, particularly, if such floats require detachment of the leaders, hooks, or weights or removal of the line from the rod.

To meet this situation, we have devised a bob or float made of two hollow sections 2 and 3 of substantially semi-ellipsoidal formation hinged together at 4 at their meeting edges at their largest transverse diametrical center. Each section is substantially a counterpart of the other viewed from the outside when closed one upon the other with their ellipsoidal flat sides 5 and 5' in close meeting relations, but the meeting faces of the two sections are constructed differently. Section 2 has its side face 5 reduced in area by a border channel or groove 6 and projected laterally more or less beyond the longitudinal center or axis of the bob, and section 3 has a border flange 7 surrounding its flat side 5' to provide a suitable open recess to snugly accommodate the projecting side 5 of section 2. In this way practically no water compartment remains between the two sections when tightly closed except the relatively small straight open passage 8 which extends from end to end of section 2 centrally within the flat side portion 5, see Figs. 4 and 5. This passage 8 is simply large enough to accommodate a fish-line, and when the fish-line is in place the passage is practically closed to the entrance of water. The flange 7 in section 3 opposite the ends of the passage 8 is slotted or notched at 9 to permit the fish-line to extend completely through the float. In fact, the slotted flange effectually guards against displacement of the line and especially prevents wedging or entrance of the line into the joint or border meeting edges of the two sections. Consequently, the float or bob is free to slide on the fish-line, when the two sections are closed, and locking of the two sections together is accomplished by a snap spring lock 11 secured to flange 7 and having a projecting part 12 adapted to enter a shouldered recess 14 in the side of section 2, see Fig. 8. Any suitable locking device may be used.

The bob or float is intended to be slidably engaged with the fish-line 15, but may be clamped thereon by doubling the line within the passage 8 so that it will be wedged therein when the two sections are closed and locked together, or a knot may be made in the line and clamped in the passage in the same way. But the preferred way of using the float is to provide the line with a knot or stop 16 at a predetermined distance from the hook end of the line whereby a limit of movement of the float on the line is established and the lower or free portion of the line may be supported by and suspended from the float at any desired depth in the water substantially as shown in Fig. 2. Then when the fish-line is reeled in or the rod lifted the float will remain on the surface of the water while the line passes therethrough until the tie knot 17 for leader 18 is engaged, whereupon the float will be lifted from the water with the leader and hook end of the line. In casting the line, the float is at the leader end thereof and as soon as the float strikes the water the line is free to run downward through the passage 8 until the knot or stop 16 checks its descent to the limit of fishing-depth desired.

The sections 2 and 3 are made of celluloid preferably, but other light-weight and waterproof materials may be used instead, and both sections are hollow preferably to make an exceptionably buoyant bob.

What we claim is:

1. A bob for fish lines consisting of two equal sections hinged together and provided with flat inner sides closed to form hermetically sealed chambers within and adapted to close one upon the other, one of said sides having a groove for a fish line and the other side having notches in its edge opposite said groove; and a clamp adapted to lock said sections together.

2. A bob for fish lines consisting of two equal semi-ellipsoidal sections hinged together and provided with flat inner walls forming hollow fluid tight interior chambers in said sections and one of said inner walls having a channel lengthwise to receive a fish line and the other section having a border flange and notches in said flange opposite said channel to accommodate the line.

3. A bob or float comprising a pair of equal sections hinged together and provided each with flat inner opposed sides closed one upon the other and one of said sides having a fish-line retaining channel lengthwise therein and the opposite section constructed to engage upon the line over said channel and a clamp adapted to lock the sections together.

In testimony whereof we affix our signatures in presence of two witnesses.

WALTER W. GREGORY.
PETER D. MAIRE.

Witnesses:
R. B. MOSER,
M. SCHWAN.